(12) United States Patent
Bernzen et al.

(10) Patent No.: US 7,894,959 B2
(45) Date of Patent: Feb. 22, 2011

(54) METHOD AND DEVICE FOR ACTUATING A PASSENGER PROTECTION MEANS

(75) Inventors: Werner Bernzen, Ehningen (DE);
Dominic Reutter, Notzingen (DE)

(73) Assignee: Daimler AG, Stuttgart (DE)

( * ) Notice: Subject to any disclaimer, the term of this patent is extended or adjusted under 35 U.S.C. 154(b) by 39 days.

(21) Appl. No.: 11/995,565

(22) PCT Filed: Jul. 12, 2005

(86) PCT No.: PCT/EP2005/007521
§ 371 (c)(1),
(2), (4) Date: Oct. 22, 2009

(87) PCT Pub. No.: WO2007/006326
PCT Pub. Date: Jan. 18, 2007

(65) Prior Publication Data
US 2010/0036565 A1   Feb. 11, 2010

(51) Int. Cl.
*B60R 22/00* (2006.01)
(52) U.S. Cl. .................. 701/45; 701/46; 180/232; 180/268; 180/271; 280/734
(58) Field of Classification Search ............ 701/45, 701/46; 180/169, 170, 232, 268, 271; 280/734, 280/735
See application file for complete search history.

(56) References Cited

U.S. PATENT DOCUMENTS 7,178,622 B2   2/2007   Eberle et al.

| 2004/0089758 A1* | 5/2004 | Bullinger et al. ............ 242/374 |
| 2006/0195231 A1 | 8/2006 | Diebold et al. |
| 2008/0021617 A1* | 1/2008 | Baumann et al. .............. 701/46 |

FOREIGN PATENT DOCUMENTS

| DE | 36 37 165 A1 | 5/1988 |
| DE | 101 21 386 C1 | 8/2002 |
| DE | 101 21 956 C1 | 11/2002 |
| DE | 10 2004 018 394 A1 | 11/2005 |
| EP | 1 247 699 A2 | 10/2002 |
| JP | 05278563 A | 10/1993 |
| JP | 08091169 A | 4/1996 |
| JP | 2004131070 A | 4/2004 |
| JP | 2004526623 (T) | 9/2004 |
| WO | WO 2004/085220 A1 | 10/2004 |

OTHER PUBLICATIONS

International Search Report dated Mar. 13, 2006 with English translation of the relevant portion and PCT/ISA/237 with English translation of the relevant portion (Sixteen (16) pages).

* cited by examiner

*Primary Examiner*—Gertrude Arthur Jeanglaud
(74) *Attorney, Agent, or Firm*—Crowell & Moring LLP

(57) ABSTRACT

In a method for actuating a vehicle occupant protection system, a sensor senses driving state data, and a reversible vehicle occupant protection device can be triggered to move into an effective position, prior to an imminent collision. A setpoint braking deceleration, which triggers the vehicle occupant protection device when a threshold value is exceeded, is determined by a predictive surroundings sensing unit in advance of an imminent collision. A check is made to determine whether the setpoint braking deceleration exceeds a threshold value, by referring to a deceleration characteristic curve that is dependent on the vehicle speed.

16 Claims, 1 Drawing Sheet

METHOD AND DEVICE FOR ACTUATING A PASSENGER PROTECTION MEANS

This application is a national stage application of PCT International Application No. PCT/EP2005/007521, filed Jul. 12, 2005, the entire disclosure of which is herein expressly incorporated by reference.

BACKGROUND AND SUMMARY OF THE INVENTION

The invention relates to a method and apparatus for actuating a vehicle occupant protection device in a vehicle having a sensor system which senses driving state data, and a reversible vehicle occupant protection means that can be triggered and moved into an effective position before a collision occurs.

For example, emergency braking, skidding of the vehicle or an imminent collision is understood to be a critical driving situation or a critical driving state. In such critical situations, preventive measures for vehicle occupant protection are activated and deactivated (that is, are reversed when the danger is passed).

In addition to customary restraint systems such as airbags and seat belts with a seat belt tensioner, there are a series of further controllable vehicle occupant protection systems in vehicles which have a restraining and/or energy-absorbing effect to protect a vehicle occupant in the event of a collision. Examples of such vehicle occupant protection systems are movable impact bodies, cushions and head rests whose size, hardness, shape and position can be changed by means of an actuation. In addition to these vehicle occupant protection systems, it is possible to provide further actuatable protection devices which reduce the consequences of an accident for a vehicle occupant by positioning the vehicle occupant; that is, he or she is placed in a position that is favorable in terms of an accident. Devices for positioning the vehicle occupant are, for example, an electric seat adjustment system, a head rest adjustment system, a seat belt pretensioner and movable upholstered elements.

When actuating the vehicle occupant protection system to reduce the consequences of an accident in road traffic, it is possible to differentiate between preventive measures, which are taken before an accident, and acute measures, which are taken after an accident has been detected. The invention relates in particular to actuation of a protection device as a preventive measure, i.e., as a preventive protection measure.

German patent document DE 101 21 386 C1 discloses a method for actuating a reversible vehicle occupant protection systems in a motor vehicle having a driving state sensor system which senses driving state data, and having a reversible vehicle occupant protection system that can be triggered before the collision time, and as a result moved into an effective position. The driving state data is monitored with regard to a state of "emergency braking", and when such a state is determined the vehicle occupant protection systems is activated. The data processing device additionally identifies a state of "oversteering" and a state of "understeering". If either of these states is detected by the data processing device, the reversible vehicle occupant protection system is actuated. After the critical driving state has passed, the actuated vehicle occupant protection system is deactivated.

The braking deceleration which is necessary for emergency braking is usually determined by a surroundings sensing system (for example, a radar unit), an ultrasonic sound measuring unit or an optical sensing unit. In this context, the presence of a critical situation, in particular an imminent collision, is determined by means of the distance from an obstacle and the relative speed with respect to said obstacle.

German patent document DE 36 37 165 A1 or DE 101 21 956 C1 discloses a method for actuating a vehicle occupant protection system for a vehicle in which an obstacle in front of the vehicle can be detected by a surrounding and/or distance sensor system. When an obstacle is detected, a braking deceleration that is necessary to bring the vehicle to a standstill before striking the obstacle is determined and compared with a maximum possible braking deceleration. A vehicle occupant protection system is activated as soon as the necessary braking deceleration exceeds the maximum possible braking deceleration.

German patent document DE 102004018394.5, which was published after the present application, discloses a method comparable to that described above, in which the necessary braking deceleration is not determined, or it is not evaluated (in terms of its exceeding a threshold) until a driver of the vehicle has activated a brake activation element for initiating a braking process.

One object of the invention is to provide an improved method and a device of the type described above, in which the preventive triggering of vehicle occupant protection means is felt by the driver to be as plausible as possible.

This and other objects and advantages are achieved by the method according to the invention, in which a setpoint braking deceleration is determined by a predictive surroundings sensing unit. In particular, the surroundings sensing unit determines the presence of at least one critical driving state, and if such a driving state is present the vehicle occupant protection means is activated. The setpoint braking deceleration is checked using a deceleration characteristic curve which is dependent on vehicle speed, and the vehicle occupant protection means is activated if the determined requested braking deceleration is above the deceleration characteristic curve.

A reversible vehicle occupant protection device is a device whose purpose is to reduce the force loading on a vehicle occupant in the case of a collision. In this context, the protection device can be changed repeatedly from an initial state to an effective state by activation, and be reset again to the initial state from the effective state by deactivation. For example an electric seat adjustment device, a reversible seat belt tensioner, an electric adjustment device for vehicle openings, a head rest adjustment means, or a movable upholstered element are activated as reversible vehicle occupant protection systems. Electrically adjustable impact protection devices can also be considered to be reversible vehicle occupant protection devices in the sense of the invention, and these can also comprise, for example, reversibly deployable engine hoods or extendable bumpers whose aim is predominantly to protect pedestrians.

The advantage of the method according to the invention is that the setpoint braking deceleration which is predefined (for example, by a radar system taking into account the distance and relative distance to the obstacle), can be checked by referring to further conditions which reflect the criticality of the driving situation and its perception by the driver, and can be used for more differentiated actuation of a reversible vehicle occupant protection means. In this way, the vehicle occupant protection means is activated only if the activation is also perceived as plausible for the respective driving situation by the driver. In particular, the subjective sensation of the driver with regard to braking decelerations is dependent on the driving speed.

When the predefined or requested setpoint braking deceleration is checked, it is possible to achieve coordination with the subjective sensation of the driver by means of the deceleration or acceleration characteristic curve which is dependent on the vehicle speed (such subjective sensation being dependent, inter alia, on the driving speed). In the text which follows, "deceleration" refers to the absolute value of a negative acceleration of the vehicle during braking.

In one advantageous embodiment, in a speed range above a threshold of approximately 60 km/h, the deceleration characteristic curve (which corresponds to a critical braking deceleration) drops continuously to a base absolute value. The assumed reduction in the deceleration characteristic curve at high speeds, and the more sensitive activation of the vehicle occupant protection means which is coordinated therewith, is felt by the driver to be plausible since at a high driving speed the subjective sensation of the driver perceives the braking decelerations in a more critical way.

As a further condition for influencing the deceleration characteristic curve, it is possible to differentiate whether an emergency braking process is i) triggered by the driver and supported by a radar-supported braking assistance system, or ii) triggered by a surroundings sensing system without intervention by the driver. In both cases, the necessary setpoint braking deceleration on which the present method is based is determined by the surroundings sensing system, based on the distance from, and speed relative to, an obstacle.

If the emergency braking process is triggered by a driver and is supported by a braking assistance system, a hazardous situation or emergency situation is inferred from the behavior of the driver. For this purpose, at least one parameter such as brake pressure, speed of activation of the brake pedal and the speed with which the acceleration pedal is released are used to evaluate the braking process. In order to calculate the necessary brake pressure, the surroundings sensing unit calculates the necessary setpoint braking deceleration based on the distance from speed relative to the obstacle, in order, if appropriate, to correspondingly correct the brake pressure requested by the driver via the brake pedal.

In the case of a braking process which is triggered by the driver, he or she is already prepared for the hazardous situation, and accordingly a high degree of braking deceleration is consciously perceived and tolerated. The deceleration characteristic curve for the critical braking deceleration is therefore above a deceleration characteristic curve for an autonomous partial braking process in which a driver is surprised by an autonomous braking process, and may or may not be taking avoidance measures before the obstacle.

For example, as shown in FIG. 2, in the case of a braking process which is triggered by the driver in a lower speed range of 0 km/h to 60 km/h, a setpoint braking deceleration of up to 10 m/s$^2$ which is predefined by the surroundings sensing unit is still considered to be controlled and acceptable. Accordingly, it is still not necessary to trigger any vehicle occupant protection system, even if the loading in the limiting range is already felt to be at a maximum by the driver. This high threshold for the critical braking deceleration is felt to be plausible by the driver because triggering of a vehicle occupant protection system would be perceived as unnecessary. Moreover, in the case of a setpoint braking deceleration of up to 10 m/s$^2$ which is predefined by the surroundings sensing unit, it is still possible to avoid a collision because such high braking deceleration can be reliably applied by a vehicle brake system when there is a coefficient of friction of μ=1.0. Since no collision is expected, triggering of the vehicle occupant protection means would be implausible. However, if the real deceleration is actually too low, in the next step the setpoint braking deceleration would be increased by the surroundings sensing unit, so that the deceleration characteristic curve is exceeded and the vehicle occupant protection means is triggered.

In a medium speed range of 60 km/h to 120 km/h, a reduction of the critical braking deceleration from 10 m/s$^2$ to at least 8 m/s$^2$ is accepted. In an upper speed range (higher than 120 km/h), a critical braking deceleration of approximately 8 M/s$^2$ is accepted. The accepted reduction in the critical braking deceleration at high speeds and the more sensitive activation of the vehicle occupant protection means which is coordinated therewith is perceived as plausible by the driver, because braking deceleration at relatively high driving speeds is perceived to be more critical. On the other hand, the threshold which is selected is still so high that no undesired triggerings occur. For example, in the case of a "sporty" targeted braking carried out intentionally by the driver, for example to avoid a stationary obstacle, the braking deceleration is usually in the region up to a maximum of 7 M/s$^2$.

In the case of an autonomously triggered braking process, the deceleration characteristic curve is to be configured in a more sensitive way, which could be done by adapting the curve parameters of the deceleration characteristic curve described above. For example, the cut-off values for the critical braking deceleration could be reduced to 3.5 M/s$^2$ and 1.5 M/s$^2$. The speed ranges could also be defined by cut-off values of 50 km/h and 150 km/h (FIG. 3).

In a further embodiment the vehicle occupant protection is actuated only if the vehicle speed is higher than a predefined minimum. For example, 30 km/h is predefined as a minimum speed, and the vehicle occupant protection is activated only starting from a vehicle speed higher than 30 km/h. This condition can be interrogated separately or can be implemented by means of a suitable critical deceleration characteristic curve which assumes an unattainable high value below the minimum speed.

In various embodiments the deceleration characteristic curve can additionally be varied as a function of other parameters.

The braking deceleration which is determined by one of the predictive surroundings sensing units (for example a radar unit, an infrared inter-vehicle distance measuring device, an ultrasonic sensor or a camera) represents a setpoint braking deceleration which is necessary to avoid a collision. In order to determine the setpoint braking deceleration necessary to avoid a collision, a coefficient of friction of μ=0.9 of the underlying surface (which corresponds to a dry and normal underlying surface, for example a dry asphalted underlying surface) is typically assumed. In one development, in order to take into account the different states of the underlying surface and the differing adhesion, it is possible to predefine the deceleration characteristic curve as a function of a coefficient of friction for the underlying surface which is obtained, for example, by a sensor. For example, different deceleration characteristic curves can be stored as a function of the state of the road (such as a cobbled road, a country road or a freeway), and they can be correspondingly activated when the road is traveled on. This requires the state of the road to be determined in advance. Suitable methods are known from the prior art.

Calculation of the setpoint braking deceleration based on a permanently predefined coefficient of friction of μ=0.9 leads, (particularly in the case of smooth road conditions) to unrealistic results: when braking hard on a smooth (for example, wet) underlying surface with a very low coefficient of friction, the wheels would no longer grip and roll but would instead slide, which can lead to locking of the wheels. A setpoint braking deceleration which is predefined by the radar system when the vehicle approaches an obstacle, and which would still be below the deceleration characteristic curve, would not be uncritical in any way because it would in fact be completely impossible to apply the setpoint braking deceleration, due to the actual low coefficient of friction.

In the text which follows, a method is described for remedying this deficiency in a simple and cost-effective way. This applies generally to any method for triggering vehicle occupant protection systems which are based on an evaluation of the setpoint braking deceleration on which an assumption of a constant coefficient of friction is made. The interrogation (low μ interrogation) takes place in a parallel triggering path.

For a braking process with intervention of an antilock brake system ABS (ABS situation), immediate activation of the vehicle occupant protection system occurs in a simple embodiment. This is appropriate, for example, for a case in which the predictive surroundings sensing unit detects a collision which cannot be avoided and predefines a maximum braking deceleration (emergency braking) which still serves only to reduce kinetic energy in advance of the collision. It is then in fact certain that the grip limit is exceeded and the braking deceleration which is available is never sufficient to prevent an accident. For this reason, any additional interrogation is superfluous.

For a case of partial braking with intervention of the ABS (ABS situation), in which there could still be the possibility of avoiding an accident, it is, however, necessary to check in a further interrogation how great the actual longitudinal deceleration of the vehicle is in order to obtain an indication of the braking effect which is occurring. When an ABS intervenes, braking is always carried out to the limiting value of the coefficient of friction so that in this situation the coefficient of friction is directly correlated to the longitudinal deceleration of the vehicle and could be derived therefrom. In order to check whether a critical state is present in which a collision would no longer be avoidable due to the reduced coefficient of friction, a coefficient (μ) of friction of less than 0.5 is considered critical. For this reason, in the ABS situation the longitudinal deceleration of the vehicle is determined and is compared with a predefined threshold value or limiting value of, for example, 5 m/s$^2$. If the vehicle longitudinal deceleration drops below this threshold value (i.e., if the longitudinal deceleration of the vehicle is, for example, only 4 m/s$^2$), this is due to the inadequate grip of the covering of the underlying surface. Thus, the vehicle occupant protection means is activated, because adequate setpoint braking deceleration could never be achieved and an accident is very probable.

The deceleration characteristic curve for the setpoint braking deceleration is reduced as a supplementary measure for making available better preventive protection in boundary situations in terms of vehicle movement dynamics if the ABS or generally a vehicle movement dynamics control system is activated for a predefined time period. For this purpose, the vehicle movement dynamics control system is monitored for activation. In the process it is checked whether the vehicle movement dynamics control system is actuated for a predefined time period of, for example, at least 0.15 sec. If so, facilitated triggering of preventive measures is achieved with the reduction of the deceleration characteristic curve by virtue of the fact that the deceleration characteristic curve can be more easily exceeded by the setpoint braking deceleration which is predefined by the radar system. This is appropriate in particular in conjunction with the interrogation, described above, for a low coefficient of friction (low μ), which activation of the ABS requires.

Different vehicle movement dynamics control systems (for example an antilock brake system ABS, an electronic braking force distribution means EBV, an electronic stability program ESP, a traction controller ASR) are expediently monitored in parallel for activation of, for example, at least 0.1 sec.

Alternatively or in an additional condition it is possible to compare, instead of the setpoint braking deceleration, a variable derived from the setpoint braking deceleration, with a corresponding characteristic curve which is modeled on the deceleration characteristic curve. For example, by means of a vehicle model, it is possible to determine from the setpoint braking deceleration predefined by the radar system a setpoint braking torque said setpoint braking torque being required to determine the brake pressure which is predefined to the wheels, in order to make a decision about the triggering of vehicle occupant protection system using a braking characteristic curve that is dependent on vehicle speed. These derived variables are also to be understood as being included in the term "setpoint braking deceleration", unless they differ explicitly therefrom, as in the following exemplary embodiment.

The setpoint braking torque follows the setpoint braking deceleration with a delay, which corresponds to the effect of a low-pass filter. In one embodiment, the vehicle occupant protection means is actuated only if the necessary setpoint braking torque is (also) above a braking characteristic curve. Activation of the vehicle occupant protection system as a function of the predefined setpoint braking torque ensures that, when autonomous partial braking occurs with moderate setpoint braking deceleration (no emergency braking), the vehicle occupant protection system is not activated until after the start of braking. Accordingly, connection into the circuit does not occur until the driver has already been prewarned by the autonomous partial braking.

A similar effect can be achieved if it is ensured by a corresponding interrogation of a timer that the vehicle occupant protection means is not triggered until after the expiration of a time period of, for example, 400 ms from the activation of the autonomous partial braking.

Other objects, advantages and novel features of the present invention will become apparent from the following detailed description of the invention when considered in conjunction with the accompanying drawings.

DETAILED DESCRIPTION OF THE DRAWINGS

Parts which correspond to one another have been provided with the same reference symbols in all the figures.

Figure 1:
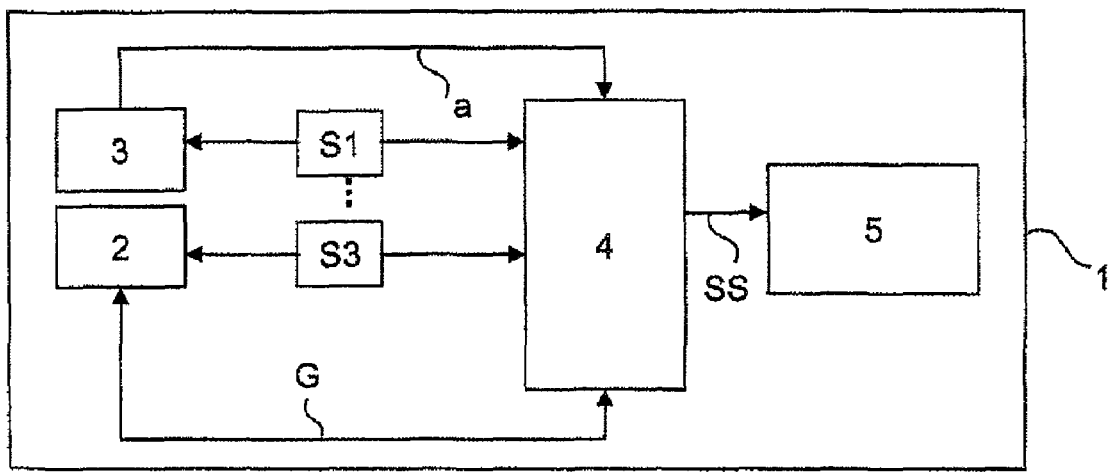
FIG. 1 is a block diagram of a device according to the invention.

FIG. 1 is a schematic block circuit diagram of a vehicle 1 which is equipped with a vehicle movement dynamics control system 2 and a surroundings sensing system 3. The vehicle 1 comprises, as a vehicle movement dynamics control system 2 which senses all the vehicle movement dynamics driving state data, for example, one or more of the following systems: an antilock brake system, a traction controller, an electronic stability program, an electronic braking force distributor or a brake control system. For example a radar unit, an ultrasonic sound sensor or a camera is provided as a surroundings sensing system 3.

The vehicle 1 also has at least one reversible vehicle occupant protection means 5 which is connected to a control unit 4. For example an electric seat belt tensioner, seat belt pretensioner or seat belt retraction tensioner, an electric seat adjustment device, an electric adjustment device for vehicle openings and/or an electrically adjustable impact protection device. The vehicle occupant protection means 5 is/are reversible, i.e., they can be moved repeatedly from an initial state into an effective state and reset again.

The control unit 4 is connected to the vehicle movement dynamics control system 2 and the surroundings sensing unit 3 via a data bus, for example.

The control unit 4 continuously checks whether i) an emergency or partial braking process that is triggered by a driver or ii) an autonomous partial braking process or emergency braking process, is occurring. In order to deactivate the vehicle occupant protection means which have been activated, for example, on the basis of an active emergency braking process (ABS intervention) or an autonomous partial braking process, in addition to the elimination of the identified critical driving situation, it is checked whether the active emergency braking process and the autonomous partial braking process are still active. If so, the actuation means of the vehicle occupant protection means remains active; otherwise the actuation is deactivated or reset.

The vehicle movement dynamics control system 2 determines, by means of an associated sensor system S1, vehicle state data (for example the driving speed, the wheel speeds of the vehicle 1, an actual yaw rate, the setpoint yaw rate, lateral acceleration and/or longitudinal acceleration). For example a longitudinal acceleration sensor, a steering angle sensor, a lateral acceleration sensor and wheel speed sensors are provided as a sensor system S1. The latter can, if appropriate, be evaluated in combination in order to determine further driving state data. For example, oversteering of the vehicle 1 is identified by the vehicle movement dynamics control system 2 if the rear part of the vehicle veers off and a dangerous driving state could occur.

The surroundings sensor system 3 determines, by means of an associated sensor system S2, driving state data about an obstacle lying ahead, for example by means of the state of the road lying ahead. From the deviation between the setpoint values and actual values of the sensed driving state data, or from the fact that predefined threshold values are exceeded and/or undershot, a critical driving situation or a critical driving state is determined. For example, an obstacle which lies ahead and is approaching is identified by means of the surroundings sensing system 3 and a possible collision, requiring a partial braking process or emergency braking process, is indicated. For this purpose, the surroundings sensing system 3 determines a necessary setpoint braking deceleration a, which is necessary in order to prevent the collision or alleviate its consequences.

If such a critical driving situation is detected, either i) the vehicle occupant protection means 5 is directly actuated, or ii) at first the deceleration characteristic curve is reduced by means of the control unit 4, accompanied, for example, by evaluation of either x) the manipulated variable G of the vehicle movement dynamics control system 2 for the case of oversteering or understeering, or y) braking deceleration a which is determined by the surroundings sensing system 3 for the case of an emergency braking process. A high value of the manipulated variable G is an indicator of severe oversteering or of imminent severe oversteering of the vehicle and/or severe braking deceleration a is an indicator of an emergency braking process and can lead to the setting of a control signal SS for the activation of a vehicle occupant protection means.

Various conditions for the checking the requested braking deceleration a for differentiated actuation of the vehicle occupant protection means 5 are described in more detail below.

The surroundings sensing system 3 is able to detect obstacles which can lead to a collision. The associated computing unit or control unit 4 (which may be embodied separately or be integrated) determines necessary braking deceleration a (also referred to as setpoint braking deceleration) which would prevent a collision. In conjunction with a suitable braking assistance or braking control system it is possible to predefine corresponding braking torque values for a corresponding partial braking process or emergency braking process. The braking assistance system is illustrated as a vehicle movement dynamics control system 2 in the figure.

When the braking assistance system (BAS) intervenes, the driver is assisted in carrying out an emergency braking process by increasing the braking torque which is requested by the driver, as necessary to prevent a collision. In a further function, the radar-supported braking assistance system triggers an autonomous partial braking process or emergency braking process if the driver does not react to an imminent collision.

It is significant that the braking functions which are carried out by the braking assistance system and the activation of protection means for the driver are coordinated with one another in a plausible fashion. For this purpose, primarily the setpoint braking deceleration or braking deceleration a or the requested setpoint braking torque requested by the surroundings sensing system 3 or its control unit 4 is checked using further criteria.

Figure 2:
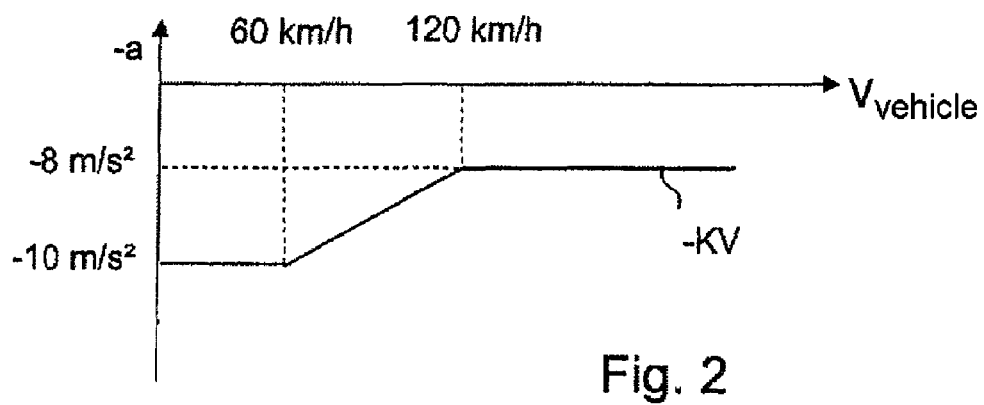
FIG. 2 is a diagram of the deceleration characteristic curve which is dependent on the vehicle speed.

I. Assistance Provided to the Driver in the Event of a Partial Braking Process or Emergency Braking Process by the Braking Assistance System:

It is first checked whether the braking assistance system is activated and there is a request for a setpoint braking deceleration a. If so, it is checked whether the vehicle speed $v_{vehicle}$ is higher than a predefined minimum speed (for example, 30 km/h). If the vehicle is traveling faster than 30 km/h and furthermore the braking assistance system is activated, the braking deceleration a (=setpoint braking deceleration) which is determined is checked using a deceleration characteristic curve KV. FIG. 2 illustrates the setpoint acceleration which corresponds to the value −a in the case of braking process, for which reason the characteristic curve is also represented with a minus sign as −KV. The vehicle occupant protection means 5 is activated only if the braking deceleration a which is determined is above the deceleration characteristic curve KV or −a is below −KV. The characteristic curve has already been discussed during the general explanations of the invention.

Since the setpoint braking deceleration a which is determined and predefined by means of the surroundings sensing system 3 is always based on a coefficient of friction μ of 0.9, in one embodiment there is a parallel interrogation about the coefficient of friction μ which is actually present, which is easily possible during an ABS intervention because the wheels are braked only as far as the limit of the coefficient of friction.

II. Assistance Provided to the Driver in the Event of a Partial Braking Process or Emergency Braking Process by the Braking Assistance System, with Simultaneous ABS Intervention.

At first it is checked whether the braking assistance system is activated and whether there is a request for setpoint braking deceleration a. If so, it is checked whether the vehicle speed $v_{vehicle}$ is higher than a predefined minimum speed (for example, 30 km/h). If the vehicle is traveling faster than 30 km/h and the braking assistance system is activated, it is additionally checked whether the wheels (for example, both front wheels) are being controlled by an antilock brake system ABS in order to prevent locking. In particular it is checked whether the ABS function of the vehicle movement dynamics controller 2 is activated for at least 0.15 sec. If so, as already described above, the predefined setpoint braking deceleration a is checked for compatibility with the actually present coefficient of friction μ.

For this purpose, the vehicle longitudinal deceleration ax is determined and monitored for undershooting of a predefined threshold value of, for example, 5 m/s². If the vehicle longitudinal deceleration ax is, for example, 4 m/s2, a coefficient of friction μ below 0.5, and therefore a particularly smooth underlying surface, are present. In one embodiment of the invention, this already leads to the triggering of a vehicle occupant protection means.

In one particular refinement, the requested setpoint braking deceleration a is additionally checked in a further step using the deceleration characteristic curve KV (see FIG. 2) or a deceleration characteristic curve which is adapted to this case and has reduced cut-off values for the critical braking deceleration. The vehicle occupant protection means 5 is therefore activated only if the setpoint braking deceleration a is also above the deceleration characteristic curve KV and all the other conditions above are met. Due to the ABS control of the front wheels by the antilock brake system and the identified coefficient of friction μ below approximately 0.5, it is detected that there is a large probability that it will no longer be possible to avoid a collision. For this reason, the vehicle occupant protection means 5 is already triggered in the case of low setpoint braking deceleration requests, for example above only 3 m/s². The vehicle longitudinal deceleration ax can be determined, for example, by means of an acceleration sensor or using the vehicle reference speed which is acquired in the brake control system.

III. For an Autonomous Partial Braking Process by the Braking Assistance System:

For an autonomous partial braking process, the requested braking torque is further evaluated in order to ensure that the vehicle occupant protection systems are not activated until after the start of braking, so that there is time to warn the driver, who is thus not unnecessarily disturbed by the tensioning of a seat belt tensioner.

Figure 3:
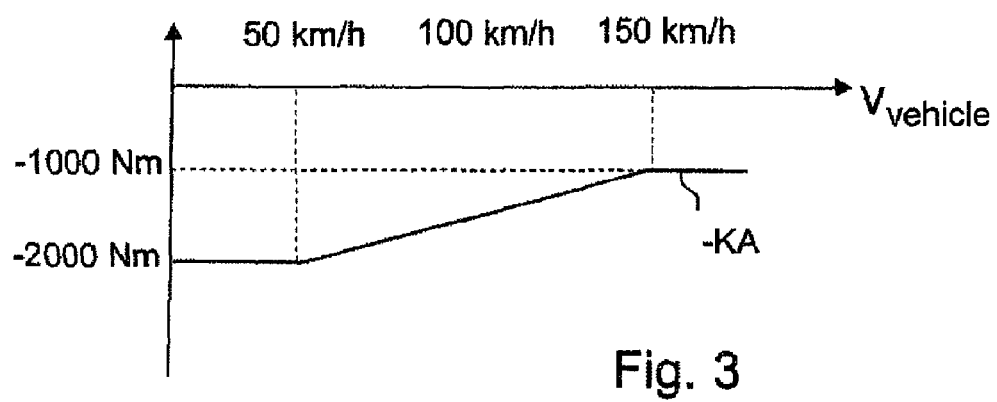
FIG. 3 is a diagram of the braking characteristic curve which is dependent on the vehicle speed.

In a first step it is checked whether the braking assistance system is active and a braking torque is requested. The vehicle speed $v_{vehicle}$ is then checked for undershooting of a minimum speed, for example of 30 km/h. The vehicle occupant protection system 5 is triggered if the requested braking torque is above a predefined braking characteristic curve KA, in which case FIG. 3 again shows these variables with a minus sign. As already explained above, the setpoint braking torque is a variable which is calculated from the predefined setpoint braking deceleration by means of a vehicle model into which, inter alia, the mass of the vehicle is also input. Here, for example a braking torque of 1000 Nm corresponds approximately to braking deceleration a of 1.5 m/s², and a braking torque of 2000 Nm corresponds approximately to braking deceleration a of 3.5 m/s².

For all the abovementioned exemplary embodiments I to III, the deactivation of the vehicle occupant protection means 5 is described in more detail below.

In order to keep the vehicle occupant protection means 5 activated even when there is a loss of an object by the surroundings sensing system 3, particular resetting conditions are defined.

For this purpose, the control signal SS for activating the vehicle occupant protection means is set until the driving situation is no longer classified as critical in a way which is plausible to the driver. For a control signal SS which has been set for a sufficiently long time, the resetting of the control signal SS occurs after the elimination of the triggering driving state and as a function of at least one further condition which is indicative of a controllable driving behavior.

In the case of a braking process which is initiated by a driver by means of the braking assistance system or in the case of an autonomous partial braking process it is therefore necessary for the following condition to be met for at least one second: neither the braking process of the braking assistance system which is triggered by the driver nor the autonomous partial braking process is still active.

This inquiry with a time condition ensures that the actuation of the reversible vehicle occupant protection system 5 (also referred to as PRE-SAFE action) is not immediately aborted when there is a brief loss of the object if other vehicle movement dynamics criteria can (still) not be met. If, subsequent to the actuation of the vehicle occupant protection means 5 as a result of a braking process which is triggered by the driver or as a result of an autonomous partial braking process, an avoidance maneuver or the like takes place, the vehicle movement dynamics resetting conditions which are met later will, of course, also come to apply even after expiry of this time condition.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for actuating a vehicle occupant protection system in a vehicle having a sensor system that senses driving state data and a reversible vehicle occupant protection system that is moveable into an effective position before a collision occurs; said method comprising:
 a predictive surroundings sensing unit determining a setpoint braking deceleration that triggers a movement of the vehicle occupant protection system into the effective position in advance of an imminent collision when said setpoint braking deceleration exceeds a threshold value; and
 checking to determine whether the setpoint braking deceleration exceeds said threshold value, by referring to a deceleration characteristic curve that varies with vehicle speed.

2. The method as claimed in claim 1, wherein:
 the vehicle occupant protection means is actuated if the setpoint braking deceleration is above the deceleration characteristic curve; and
 the deceleration characteristic curve decreases as the vehicle speed increases.

3. The method as claimed in claim 1, wherein the deceleration characteristic curve depends on whether a braking process has been initiated by the driver, or has been initiated autonomously by the surroundings sensing unit.

4. The method as claimed in claim 1, wherein in the case of an emergency braking process which is triggered by the driver, higher setpoint braking decelerations are necessary to trigger the vehicle occupant protection means than in the case of an autonomous braking process.

5. The method as claimed in claim 1, wherein the vehicle occupant protection means is actuated only if the vehicle speed is higher than a predefined minimum speed.

6. The method as claimed in claim 1, wherein the deceleration characteristic curve is predefined as a function of a sensed coefficient of friction of the underlying surface.

7. The method as claimed in claim 1, wherein:
if an antilock brake system intervenes, vehicle longitudinal deceleration is determined in a parallel triggering path; and
when a predefined threshold value is undershot, activation of the vehicle occupant protection means is permitted or brought about.

8. The method according to claim 7, wherein the predefined threshold value is 5.0 m/sec$^2$.

9. The method as claimed in claim 7, wherein the vehicle occupant protection means is activated if it is defined as a further condition that the setpoint braking deceleration exceeds the deceleration characteristic curve.

10. The method as claimed in claim 1, wherein the characteristic curve is reduced if a vehicle movement dynamics control system intervenes.

11. The method as claimed in claim 1, wherein the deceleration characteristic curve is reduced if a vehicle movement dynamics control system is activated for a predefined time period, in particular for at least 0.1 sec.

12. The method as claimed in claim 11 wherein the predefined time period is 0.1 sec.

13. The method as claimed in claim 1, wherein a requested setpoint braking torque is checked by referring to a braking characteristic curve which is dependent on the vehicle speed.

14. The method as claimed in claim 13, wherein the vehicle occupant protection means is actuated if the necessary setpoint braking torque is above the braking characteristic curve.

15. The method as claimed in claim 13, wherein the vehicle occupant protection means is triggered only after expiration of a predefined time period following activation of an autonomous partial braking process initiated by the surroundings sensing unit.

16. Apparatus for actuating a vehicle occupant protection system having a sensor system that senses driving state data, and a reversible vehicle occupant protection system that is moveable into an effective position before the occurrence of an imminent collision, wherein a setpoint braking deceleration that triggers a movement of the vehicle occupant protection system into the effective position when said setpoint braking deceleration exceeds a threshold value is determined by a predictive surroundings sensing unit in advance of an imminent collision, and checking is carried out to determine whether the setpoint braking deceleration exceeds said threshold value, by referring to a deceleration characteristic curve which is dependent on the vehicle speed, said apparatus comprising:
a vehicle occupant protection device; and
a control unit which uses a requested braking deceleration to check for the presence of a critical driving state by referring to a deceleration characteristic curve that is dependent on the vehicle speed;
wherein the vehicle occupant protection system is activated in response to presence of the critical driving state.

* * * * *